May 21, 1935. P. CAPONI 2,001,705
SAFETY TURN STOP LIGHT
Filed June 22, 1932 2 Sheets-Sheet 1

INVENTOR
Patsy Caponi.
BY
Harry Langsam
ATTORNEY

May 21, 1935.　　　　　P. CAPONI　　　　　2,001,705
SAFETY TURN STOP LIGHT
Filed June 22, 1932　　　2 Sheets-Sheet 2

INVENTOR.
Patsy Caponi.
BY Harry Langsam
ATTORNEY.

Patented May 21, 1935

2,001,705

UNITED STATES PATENT OFFICE 2,001,705

SAFETY TURN STOP LIGHT

Patsy Caponi, Philadelphia, Pa., assignor of one-half to Carmela Peroni, Philadelphia, Pa.

Application June 22, 1932, Serial No. 618,599

1 Claim. (Cl. 177—327)

My invention relates to signaling devices and relates more particularly to an electrically operated automobile direction indicator for affording operators of other cars an indication of the direction in which it is intended to steer the car having the indicator installed thereon.

Heretofore, signal indicators have been applied to automobiles which merely indicate to operators of the following car that the driver would slow or stop his vehicle. At times, it would be an advantage to signal that the operator of the vehicle is turning to the right or left without the operator of the vehicle being distracted from his duties of driving. Thereby, accidents are avoided and great convenience is afforded to the operator of the vehicle and the driving public in general.

It is therefore, an object of my invention to provide an indicator especially designed for use on motor vehicles to indicate the direction of travel of the vehicle.

Another object of my invention is to use standardized colors brilliantly illuminated to indicate the direction of travel; as when a right turn is made, the right fender lamp will indicate red and the left fender lamp will designate green.

Another object of my invention is to provide partitioning members within the lamp compartments whereby when one lamp is illuminated the other lamp is shielded from view.

A further object is to provide a direction indicator for automobiles wherein the parts may be readily mounted on each of the rear fenders of the vehicle, and easily connected to the steering post of the automobile so that the parts may function accurately and may be installed or removed without injury to the car.

With the above objects in view, my invention comprises a plurality of signal lamps mounted on a vehicle, each lamp having a plurality of light chambers with electric light bulbs therein, the corresponding electric light bulb in each lamp coacting with an electric switch in the vehicle, some of the electric switches being actuated by the turning of the steering wheel, and the others being actuated with the oscillations of the brake lever and the actuation of a switch on the steering wheel.

A further object of my invention is to signal the driver of the car approaching from the rear by having the operator move the steering wheel very slightly to the right or to the left, to indicate the intention to the approaching driver, as to whether the turn of the vehicle is to be to the right or to the left. Such means of indicating is also an aid to directors of traffic, and also eliminates the necessity of the operator making signals by extending his arm from the car.

Other objects of my invention are to provide an improved device of the character described, which is easily and economically produced, which is sturdy in construction, and which has a maximum efficiency.

With these and related objects in view, my invention consists in the details of construction and combination of parts as will be fully described in the following specification, when read in conjunction with the accompanying drawings in which:—

Figure 1:
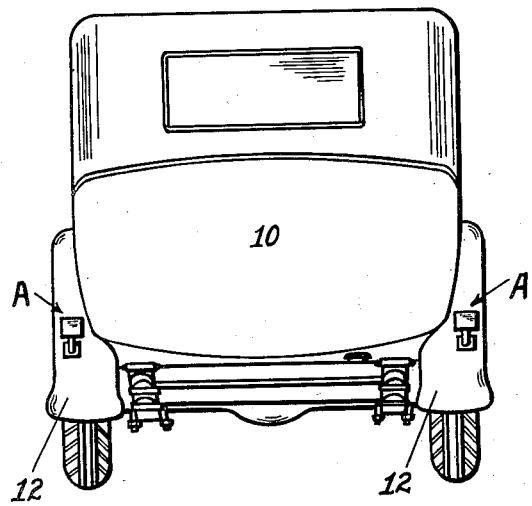
Figure 1 shows a rear elevation of a motor vehicle having signaling lamps in accordance with my invention on each fender.
Figure 2:
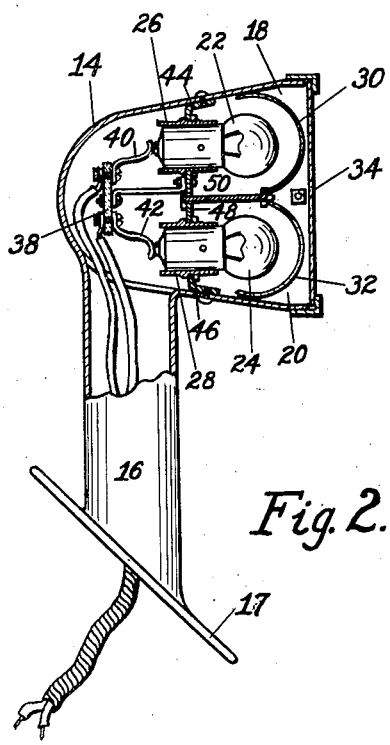
Figure 2 is a fragmentary sectional view thru the signaling lamp.
Figure 3:
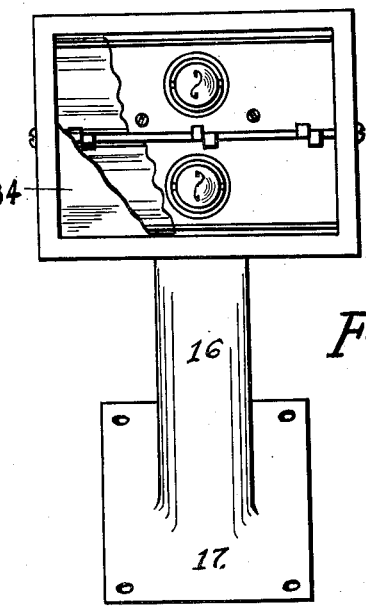
Figure 3 is a front view of the signaling lamp.
Figure 4:
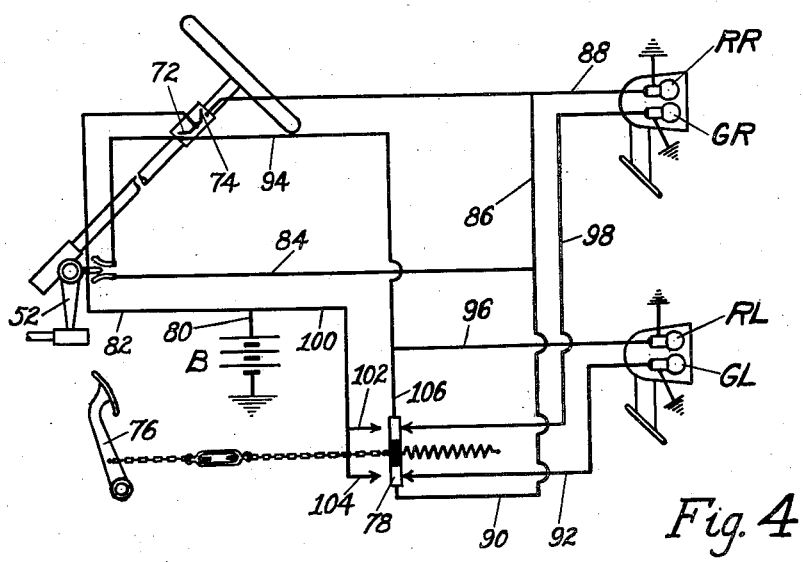
Figure 4 is a schematic view of the wiring system.
Figure 5:
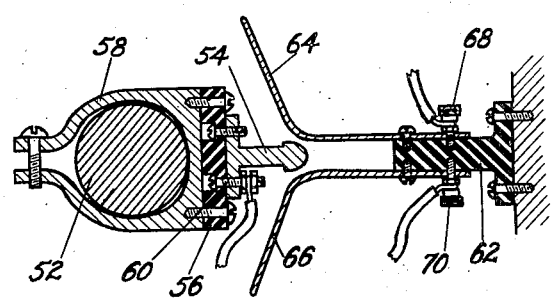
Figure 5 is a cross sectional view of my improved switch mechanism incorporated upon a steering wheel stem.

Referring to my invention in detail, I show in Fig. 1 a motor vehicle 10 having on each of the rear fenders 12 a signal lamp generally designated as A.

Each signal lamp A comprises a casing 14 mounted on a cylindrical frustrum 16, which has a base 17 adapted to be rigidly attached to the vehicle fender.

The interior of the casing 14 is subdivided into light compartments 18 and 20 having therein electric bulbs 22 and 24 respectively, which fit into sockets 26 and 28. Each of the compartments 18 and 20 has a color screen positioned in front of the incandescent electric bulbs a translucent white glass cover 34, the screen 30 being green and the screen 32 being red.

The opening of the casing 14 is covered by a translucent pane of glass 34 so that when either bulb is illuminated the entire glass 34 will appear to be of a single color to the driver approaching the signal lamp from the rear.

The rear glass may be equipped with reflex glass which gives an indication from the reflected light thrown on it. The use of reflex materials in conjunction with incandescent lamps is considered desirable from a safety standpoint.

To provide for the easy replacement of burned-out or broken bulbs, or broken electric conductors within the casing, the sockets 26 and 28 must be removable. A vertically extending base 38 of nonconducting material is provided with binding posts for the lead wires, and the base 38 also retains spring contacts 40 and 42 which engage the central contact of each lamp for completing the circuit.

Ledges 44 and 46 are connected to the housing and, also, retain the sockets 26 and 28 in position. A separator or middle bar 48 separates the sockets. A horizontally mounted partition 50 is rigidly connected to the separator 48. The screens 30 and 32 are retained against the housing and the partition 50 by the inherent tendency of the screens to expand.

Provision is made for various signal designations through the action of the brake, through the manual actuation of switches on the steering post, and through the actuation of the steering post which automatically operates the visual signals.

In order to provide automatic devices to indicate a right or left turn, I insert, upon a pitman arm shaft 52 of the steering gear, a switch arm 54 which is rigidly attached to an insulator 56 and a suitable clamp 58. A binding post 60 holds one of the lead wires from the battery. Suitably mounted upon the frame of the engine, adjacent to the arm 54, is an insulator 62 which holds electrical conducting contact blades 64 and 66. The blades being of the wiping contact type. Binding posts 68 and 70 retain lead wires in electrical contact with the blades 64 and 66. On the steering wheel, I place a two-way switch having contacts 72 and 74 which may be manually operated by the driver of the vehicle to indicate the turn he is to make. This two-way switch may be operated independently of the other circuit closing devices that are on the steering gear and on the foot brake.

When the brake pedal 76 is pushed forward to operate the brakes, a switch 78 closes the circuits to operate the red signals of each lamp.

When the steering wheel is moved to the right, directing the car to the right, the switch stud 54 makes contact with the brush 66, closing the circuit through a battery B, various circuit wires, designated as 80, 82, 84, 86, 88, 90 and 92, and a ground, thus energizing the lamp bulbs RR and GL.

With the return of the vehicle to the line of travel straight ahead and the return of the brush 54 to its neutral position, the electrical circuits are broken and the lamps RR and GL, accordingly, are extinguished.

With the movement of the steering wheel to the left, the brush 54 contacts with the blade 64 closing the circuit through the battery B, the ground, the wires 80 and 82, the bridging element 54 and the blade 64, and the wires 94, 96 and 98, thus energizing the lamps GR and RL.

Should the driver desire to turn to the right or left, prior to turning the steering wheel, he may signal his direction by manually operating the contacts 72 and 74 which are suitably mounted upon the steering wheel.

When the foot brake pedal 76 is operated, both red lamps are energized through the circuit which includes the ground, the battery, the line 80, the wires 100, 102, 104, the switch 78, and the wires 106, 96, 90, 86 and 88.

A second lamp to provide for license tag illumination and tail lamp may readily be attached to one of the signal lamps.

Although this invention has been described in considerable detail, such description is intended as illustrative rather than limiting, as the invention may be variously embodied, and the scope of the invention is to be determined as claimed.

I claim:

A signal lamp comprising a housing open at one end, a translucent closure for said housing, a partitioning structure comprising a member fastened at points intermediate the ends of the housing to divide it into front and rear compartments, a second member fastened at one end to said first member the other end extending short of said closure to divide the front compartment into two parts, a lamp in each part and mounted on one of said members, colored screens between said closure and lamps each having one edge fastened to said other end of said second member and the other edge freely engaging a wall of the housing, each of said colored screens located so that they do not engage the closure, whereby said partition members, bulbs, and screens form a unitary removable assembly.

PATSY CAPONI.